United States Patent
Umehara et al.

(10) Patent No.: US 7,496,773 B2
(45) Date of Patent: Feb. 24, 2009

(54) DATA RECORDING/REPRODUCING SYSTEM USING OPTICAL DISK APPARATUS

(75) Inventors: Shinji Umehara, Kodaira (JP); Ryotaro Hongo, Iruma (JP); Takayuki Honda, Tokyo (JP); Teruyoshi Nakahashi, Iruma (JP); Hiroshi Tsuyuguchi, Tokyo (JP)

(73) Assignee: TEAC Corporation, Tama-shi (JP)

( * ) Notice: Subject to any disclaimer, the term of this patent is extended or adjusted under 35 U.S.C. 154(b) by 408 days.

(21) Appl. No.: 11/231,200

(22) Filed: Sep. 20, 2005

(65) Prior Publication Data

US 2006/0067188 A1    Mar. 30, 2006

(30) Foreign Application Priority Data

Sep. 22, 2004  (JP)  ............. 2004-275431
Sep. 22, 2004  (JP)  ............. 2004-275465

(51) Int. Cl.
  *G06F 1/26* (2006.01)
  *G06F 1/32* (2006.01)
(52) U.S. Cl. ............ 713/320; 713/300; 713/323; 713/324
(58) Field of Classification Search ............ 713/300, 713/320, 323, 324
  See application file for complete search history.

(56) References Cited

U.S. PATENT DOCUMENTS 5,515,080 A * 5/1996 Nakamura et al. .......... 345/534
5,553,296 A * 9/1996 Forrest et al. ............. 713/323
5,914,929 A * 6/1999 Kato et al. ................ 720/656
5,953,513 A * 9/1999 Saiki et al. ................ 710/62

(Continued)

FOREIGN PATENT DOCUMENTS

JP    63-2475    1/1988

(Continued)

OTHER PUBLICATIONS

McFerrin, B. (ed.), "Information Technology—Multimedia Commands—4 (MMC-4)," InterNational Committee for Information Technology Standards, D.C., INCITS XXX, T10/1545-D, Working Draft, Revision 3d, Sep. 15, 2004, "Annex 1: Power Management," pp. 534-540.

(Continued)

*Primary Examiner*—Thomas Lee
*Assistant Examiner*—Jaweed A Abbaszadeh
(74) *Attorney, Agent, or Firm*—Christensen O'Connor Johnson Kindness PLLC

(57) ABSTRACT

A DVD recorder system having a sleep state. When a predetermined period of a non-operation state has elapsed, a key controller switches the state of a power source circuit to interrupt voltage supply, thereby causing the system to shift to the sleep state. In this state, when a signal is input from the video input terminal, the key controller controls the power source circuit to turn ON, thereby causing the system to shift to the normal state. After recovery to the normal state, a DVD processor provides instructions to a DVD drive in accordance with recording conditions which are prestored in an EEPROM, and supplies an input video signal to the DVD drive so as to start recording. Also, when a medium is inserted in the DVD drive, the key controller detects an insertion signal to control the power source circuit to turn ON, thereby causing the system to return to the normal state.

4 Claims, 4 Drawing Sheets

U.S. PATENT DOCUMENTS

| | | |
|---|---|---|
| 6,445,654 B1 | 9/2002 | Hayakawa |
| 6,741,530 B2 * | 5/2004 | Turner et al. ............. 369/30.24 |
| 6,768,711 B2 * | 7/2004 | Ueki ....................... 369/275.1 |
| 6,799,242 B1 * | 9/2004 | Tsuda et al. ................ 711/106 |
| 6,868,460 B1 * | 3/2005 | Kou ............................ 710/36 |
| 2003/0051177 A1 * | 3/2003 | Koo ........................... 713/300 |
| 2004/0151475 A1 | 8/2004 | Taira |
| 2005/0060588 A1 * | 3/2005 | Araki ......................... 713/300 |

FOREIGN PATENT DOCUMENTS

| | | |
|---|---|---|
| JP | 3-22478 | 3/1991 |
| JP | 9-91872 | 4/1997 |
| JP | 9-261554 | 10/1997 |
| JP | 10-228688 | 8/1998 |
| JP | 10-312676 | 11/1998 |
| JP | 11-149689 | 6/1999 |
| JP | 2000-3233 | 1/2000 |
| JP | 2000-132954 | 5/2000 |
| JP | 2004-220382 | 8/2004 |

OTHER PUBLICATIONS

Office Action (TW) dated Sep. 23, 2008, issued in corresponding Taiwanese Application No. 09412504.

* cited by examiner

DATA RECORDING/REPRODUCING SYSTEM USING OPTICAL DISK APPARATUS

BACKGROUND OF THE INVENTION

1. Field of the Invention

The present invention relates to a data recording/reproducing system, and more particularly to a system including an optical disk apparatus, which has a normal state which is a normal operational state and a sleep state which is a power saving state.

2. Description of Related Art

Many computer systems and DVD recorder systems including an optical disk apparatus (an optical disk drive) such as a CD drive and a DVD drive have been developed. For such systems, it is desirable that video and audio data can be recorded in a simple manner whenever desired by a user.

Japanese Patent Laid-Open Publication No. 2000-132954 describes a technology in a system concerning video cassette recorders (VCRs). Specifically, in the described technology, a VCR is connected to a set top box (STB), and on turning the STB ON at a time point which has been preset in a timer, levels of a synchronization signal, a video signal, and an audio signal exceed a predetermined value, which triggers video recording by the video tape recorder.

However, with the above technology, in order to start video recording, the system is controlled to remain in a REC PAUSE state in which recording can be started any time, which is undesirable from a viewpoint of power saving. Further, as opposed to video tape recorders, optical disk apparatuses such as a DVD recorder can adopt various types of media, for which different recoding conditions for data recording are employed. Accordingly, there is a possibility that data cannot be recorded on a medium appropriately in a system in which recording is started merely by using input of a video signal and an audio signal as a trigger as described above.

Further, Japanese Patent Laid-Open Publication No. 2000-3233 describes that in a laptop PC equipped with a DVD drive, a computer system is returned from a sleep state to an operation state in response to a wakeup signal which is generated from the drive device on inserting a medium thereinto and a process for reproducing the medium is started in response to the return of the computer system to the operation state. The controller, upon detecting a wakeup signal while the PC is in a stop or sleep state, provides a power source ON request to a power source controller to return the computer system from the stop or sleep state to the operation state.

With this system, however, in order to notify the controller of the fact that a medium is inserted into the DVD drive, it is necessary to connect the DVD drive and the controller via an additional signal line, which results in a more complicated system structure. Alternatively, a notification from the DVD drive that a recordable medium is inserted may be processed by a CPU, with the CPU remaining in somewhat of active condition even during the sleep state. This structure, however, results in the CPU consuming a great amount of power, and is therefore undesirable from the perspective of reducing power consumption.

In addition, while in the above technology, the system recovers from the sleep state to the normal operation state by means of insertion of a recording medium, it is preferable to achieve the recovery from the sleep state also by operation of the operation switch, such as operation of a PLAY key or an EJECT key, for example. In particular, it is desirable to allow the recovery from the sleep state and also immediate start of recording only by operation of a recording (REC) key.

SUMMARY OF THE INVENTION

The present invention advantageously provides a system equipped with an optical disk apparatus, which is capable of recording a video signal and an audio signal easily and reliably while achieving power saving.

The present also advantageously provides a system which can easily recover from a sleep state to a normal operation state by mean of insertion of a medium and also can recover from the sleep state and start a desired operation by operation of an operation switch, such as a recording key.

In accordance with one aspect of the present invention, there is provided a data recording and reproducing system including an optical disk apparatus which records and reproduces data with respect to an optical disk, the system comprising a processor connected to the optical disk apparatus via an interface, for transmitting a command to the optical disk apparatus and receiving reproduced data from the optical disk apparatus; key operation means; a key controller for interpreting a key operation signal generated by the key operation means and providing an instruction to the processor; and a power source circuit for supplying a power source voltage to the optical disk apparatus, the processor, and the key controller, the power source circuit being capable of switching states between a voltage supply state and a voltage interruption state at least with respect to the processor, wherein the processor shifts from a normal state which is the voltage supply state to a sleep state which is the voltage interruption state when a predetermined period of non-operation state has elapsed, and the key controller, in response to an input signal based on an external effect, instructs the power source circuit to switch from the voltage interrupt state to the voltage supply state for causing the processor to return from the sleep state to the normal state.

The present invention will be understood clearly by referring to the following embodiment. It should be noted, however, that the scope of the present invention is not limited to the following illustrative embodiment.

BRIEF DESCRIPTION OF THE DRAWINGS

A preferred embodiment of the present invention will be described in detail based on the following figures, wherein.

DETAILED DESCRIPTION OF PREFERRED EMBODIMENT

A preferred embodiment of the present invention will be described in detail with reference to the accompanying drawings.

Figure 1:
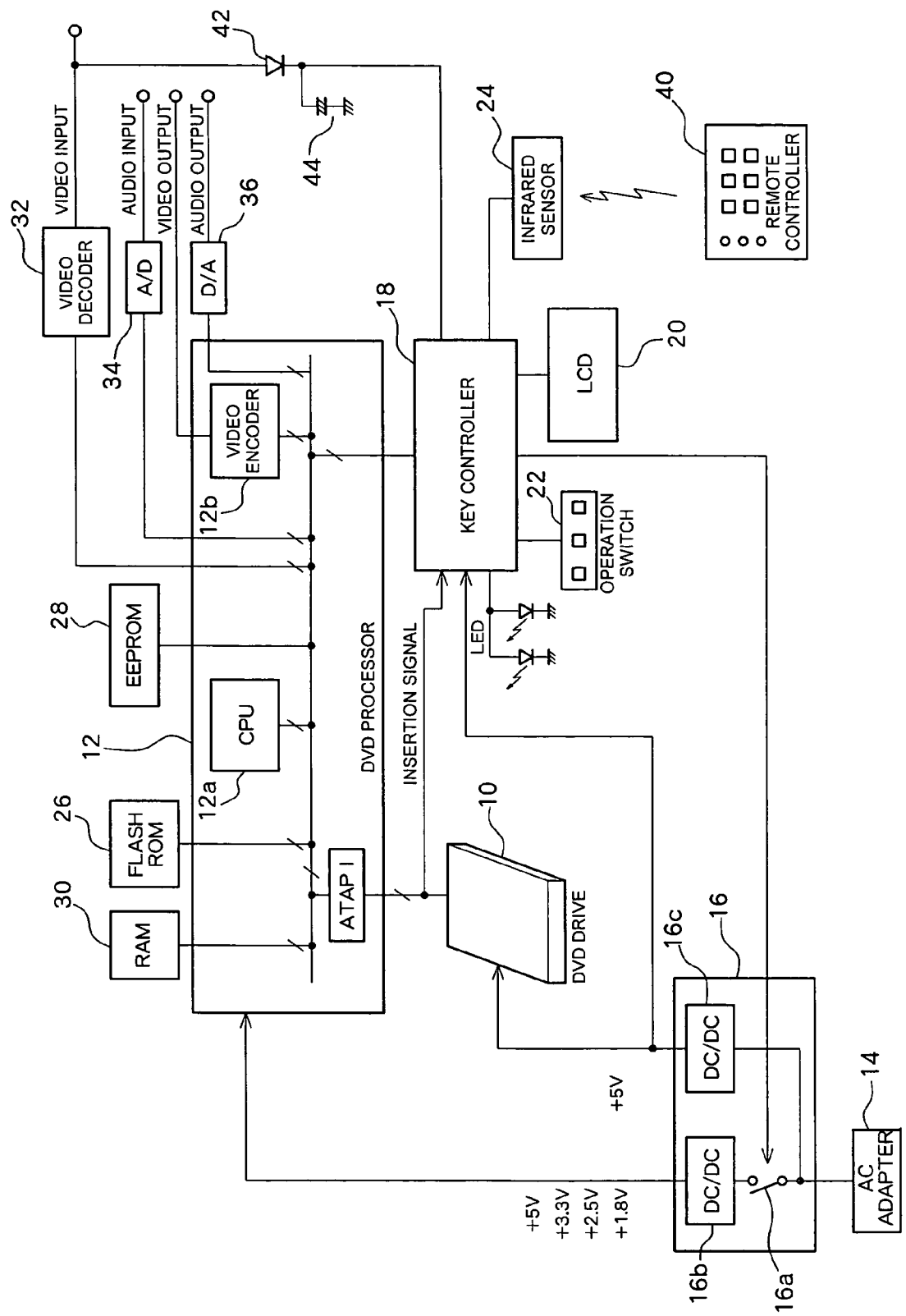
FIG. 1 is a view showing an overall structure of a DVD recorder system according to an embodiment of the present invention.

FIG. 1 shows a structure of a portable DVD recorder system according to the preferred embodiment of the present invention.

A DVD drive 10 performs recording and reproduction of data with respect to a DVD. Data to be recorded is supplied from a DVD processor 12, and data reproduced from the DVD is, in turn, supplied to the DVD processor 12. The DVD drive 10 may be a so-called combo drive which performs recording and reproduction with respect to a CD in addition to recording and reproduction with respect to a DVD. The DVD drive 10 operates by a power source voltage supplied from a power source circuit 16. The mode in which the DVD drive 10 operates is controlled by the controller of the DVD drive 10, independent of the DVD processor 12 and other sections of the system. Specifically, in the present embodiment, the DVD drive 10 has four operation (operational) modes: an active mode; an idle mode; a standby mode; and a sleep mode. A state in which the DVD drive 10 is accessing the disk in accordance with an instruction issued from a host device through an ATAPI interface is referred to the active mode. A waiting state in which the DVD drive 10 completes the access operation and waits for an instruction from the host device while causing a disk to continue to rotate with a servo mechanism such as a pickup turned ON is referred to as the idle mode. A waiting state in which DVD drive waits for an instruction from the host device while only a built-in microcomputer remains in the operation state, with the disk rotation stopped and the servo mechanism such as a pickup also stopped, is referred to as the standby mode. A state in which the DVD drive 10 causes all the functions other than the interface microcomputer to stop in accordance with an instruction from the host device, thereby maximizing power saving is referred to as the sleep mode. According to the present embodiment, the DVD drive 10 waits for an instruction in the standby mode rather than in the sleep mode. This configuration is adopted because, if the DVD drive 10 shifts to the sleep mode, various status information of the media (the types of media, manufacturer information, optimum recording power, or the like) which have been held until that point would be lost and must therefore be obtained from the medium once again at the time of recovery, which is time consuming. The DVD drive 10, which is connected to the DVD processor 12 via the ATAPI interface, receives various commands and data to be recorded from the DVD processor 12 and supplies data reproduced from the DVD to the DVD processor 12.

Further, the DVD drive 10 and the key controller 18 are connected using an unused terminal of the ATAPI interface. The DVD drive 10 includes a loading mechanism formed by an arm (not shown) which also provides a media detection function, and a microswitch is mounted on the arm so as to operate with the arm. Specifically, when a medium is inserted into the DVD drive 10, the arm provided within the DVD drive 10 comes in contact with the circumference of the medium and is pressed inside with the medium, and the microswitch which operates with the arm is turned on to activate the loading mechanism. At the same time, the DVD drive 10 transmits a medium insertion signal to the key controller 18 via the above-described unused terminal of the ATAPI interface through the microcomputer provided within the DVD drive 10. Here, the system may also be configured such that information for notifying detection of a medium is transmitted as extension status information of the ATAPI interface, rather than outputting a signal using the unused terminal as described above. In this case, the key controller 18 is also provided with an ATAPI interface for picking up only status information of medium detection.

The DVD processor 12 controls the overall DVD recorder system and includes a CPU 12a therein. The DVD processor 12 controls the operation of the DVD drive 10 in accordance with the control program stored in a flash ROM 26. An analog video signal which is input from an analog video terminal is decoded by a video decoder 32 and supplied to the DVD processor 12. Further, an analog audio signal which is input from the audio terminal is converted into a digital signal in an A/D 34 and supplied to the DVD processor 12. The DVD processor 12 applies a well-known MPEG encode process to the video or audio signal and supplies the processed signal to the DVD drive 10. Further, the data reproduced from the DVD drive 10 is encoded by the video encoder and output from a video output terminal or is converted into an analog signal by a D/A 36 and output from an audio terminal. Data to be recorded and/or reproduced data are stored in a RAM 30.

The DVD processor 12 controls the recording and reproducing operations of the DVD drive 10 in accordance with a key operation signal input from the key controller 18. Specifically, the DVD processor 12 outputs inquiries to the key controller 18, which, in response to the inquires, returns an input key operation signal (a key operation command) to the DVD processor 12. The DVD processor 12 then transmits various commands in accordance with the key operation signal which is received, to the DVD drive 10 for performing the recording and reproducing operation. Also, the current setting conditions including fixed/auto selection of input source, the priority order at the time of automatic detection of input source, with or without auto finalize, with or without auto pause, and the like, are previously written or prestored in an EEPROM 28.

Further, the DVD processor 12 includes a built-in timer for monitoring whether or not a non-operational state continues for a predetermined period. When a non-operation state has continued for a predetermined period, the DVD processor 12 issues a command for instructing transition from the normal state to the sleep state to the key controller 18.

To the key controller 18, an operation signal from the operation switch 22 provided on the system body is input, or an operation signal from a remote controller 40 is input via an infrared sensor 24. The operation switch 22 includes keys including "STANDBY", "PLAY", "REC", or the like, and the remote controller 40 similarly includes keys including "STANDBY", "PLAY", "REC", or the like. Here, neither the operation switch 22 or the remote controller 40 of the present embodiment includes a power source switch or a "POWER" key. Accordingly, when an AC adapter 14 is connected to the AC power source, the system automatically enters the normal state and then shifts to the sleep state after elapse of the predetermined period. Recovery from the sleep state to the normal state is automatically performed by several ways, as will be described below. Different commands are previously assigned to each key of the operation switch 22 and the remote controller 40, and the key controller 18 interprets these key operation signals and returns a response concerning which key is operated to the DVD processor 12. The key operation state is displayed on an LCD 20.

Further, an analog video signal is input from a video input terminal to the key controller 18 via a diode 42 and a capacitor 44. Specifically, a pulsating current (60 Hz) obtained by detecting the analog video signal by the diode 42 is smoothed by the capacitor 44 and supplied to the key controller 18.

The key controller 18 also controls the power source circuit 16 in accordance with a command from the DVD processor 12 to shift between the normal state and the sleep state. More specifically, after the AC adaptor 14 is connected to the AC power source and the DVD processor 12 enters the normal state, when a predetermined period has elapsed with the non-operation state, the DVD processor 12 instructs the key controller 18 on shift to the sleep state. The key controller 18, in accordance with the instruction from the DVD processor 12, instructs the power source circuit 16 to switch a supply voltage, thereby causing shift from the normal state to the sleep state. On the other hand, when any of the following conditions are fulfilled during the sleep state, the key controller 18 instructs the power source circuit 16 to switch the supply voltage, thereby allowing recovery from the sleep state to the normal state. The conditions may include:

(1) when a medium is inserted into the DVD drive 10;

(2) when any of the operations keys "STANDBY", "PLAY", "REC" and "EJECT" on the remote controller 40 is operated;

(3) when the operation switch 22 of the system body is operated; or (4) when a signal is input from the analog video input terminal.

The power source circuit 16 converts an AC power source voltage from the AC adapter 14 into a DC voltage and supplies it to each section. The power source circuit 16 includes a switch 16a, and DC/DC converters 16b and 16c. The switch 16a is switched by an instruction from the key controller 18 and is controlled to be OFF in the sleep state and controlled to be ON in the normal state. The DC/DC converter 16b supplies electrical power in voltages of 5V, 3.3V, 2.5V and 1.8V to each section of the system, and the DC/DC converter 16c supplies electrical power in a voltage of 5V to the DVD drive 10 and the key controller 18. As such, in the normal state, voltages of 5V, 3.3V, 2.5V and 1.8V from the DC/DC converter 16b are applied to the DVD processor 12 and a voltage of 5V from the DC/DC converter 16c is applied to the DVD drive 10 and the key controller 18, whereas, in the sleep state, no voltage is applied to the DVD processor 12 because the switch 16b is turned OFF and a voltage of 5V is applied to the DVD drive 10 and the key controller 18.

An example shift from the normal state to the sleep state when a medium is inserted with the structure as described above will be described.

Figure 2A:
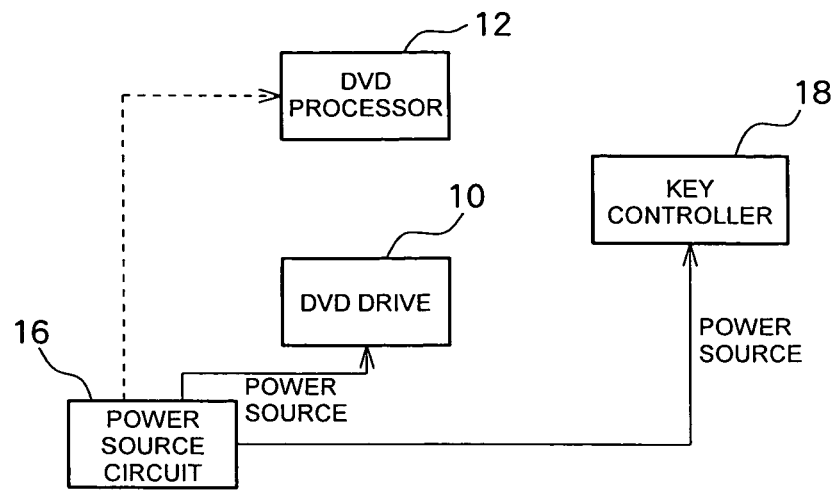
FIGS. 2A, 2B, and 2C are explanatory views showing return from a sleep state to a normal state.
Figure 2B:
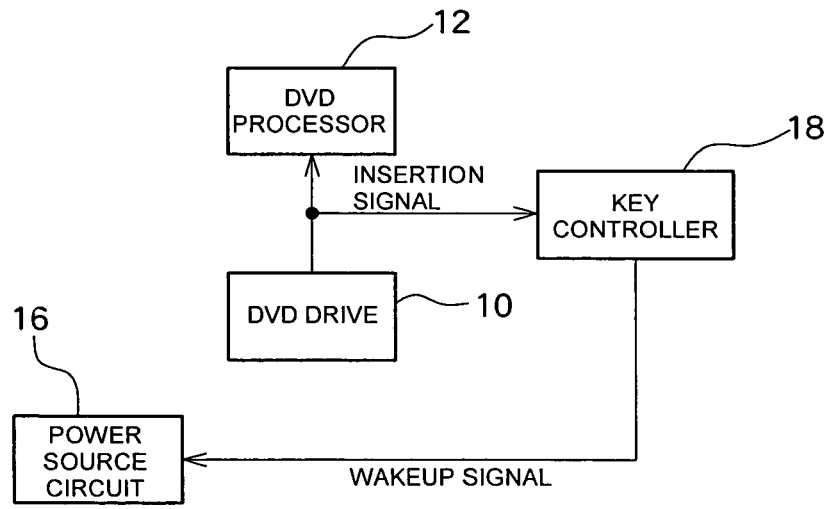
Figure 2C:
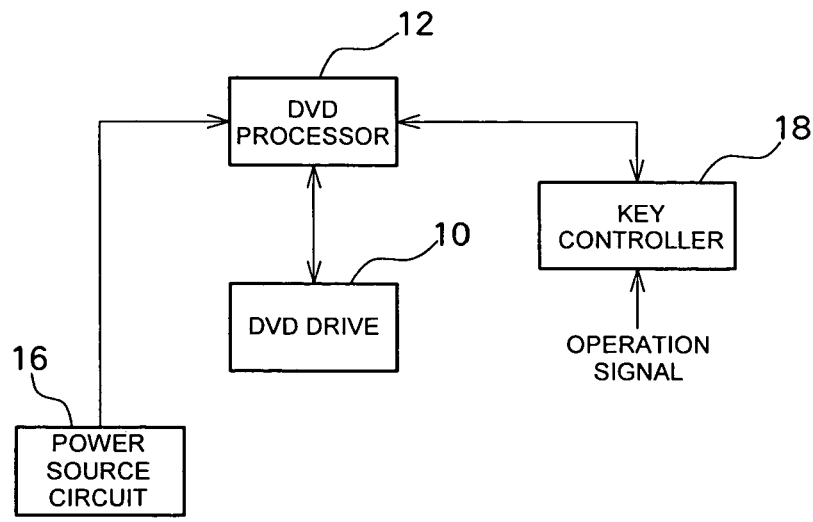

FIGS. 2A, 2B, and 2C show operations of the DVD drive 10, the DVD processor 12, the power source circuit 16, and the key controller 18 when a medium is inserted into the DVD drive 10.

FIG. 2A is a diagram showing a state in which shift from the normal state to the sleep state is performed. At this point, shift to the sleep state is instructed from the DVD processor 12 to the key controller 18, which, in response to the instruction, controls the switch 16a of the power source circuit 16 to switch from ON to OFF. Consequently, the DVD processor 12 stops its operation (in FIG. 2, interruption of the power supply is indicated by a dotted line), whereas the DVD drive 10 and the key controller 18 continue to operate by receiving voltage supply from the power source circuit 16. Here, as described above, the DVD drive 10 shifts to the standby mode, not to the sleep mode, so as to hold the media information.

FIG. 2B is a diagram showing a state in which a user has inserted a medium into the DVD drive 10 when the system is in the sleep state. Insertion of the medium pushes the arm within the DVD drive 10 to turn the microswitch ON, thereby activating the loading mechanism. By operation of the loading mechanism, the medium is pulled into the device and locked into a predetermined position. Upon turning ON of the microswitch, the microcomputer of the DVD drive 10 detects media insertion, shifts the state of the DVD drive 10 from the standby mode to the idle mode, and transmits a media insertion signal to the key controller 18 via the unused terminal of the ATAPI interface. The key controller 18, which continuously receives power supply and is in an operation state, can receive the insertion signal, and in response to the insertion signal, transmits a switch signal to the power source circuit 16. In FIG. 2B, this switch signal is shown as a "wakeup signal".

FIG. 2C is a diagram showing a state after a wakeup signal is transmitted from the key controller 18 to the power source circuit 16. In response to the signal from the key controller 18, the switch 16a of the power source circuit 16 is turned ON from OFF, for supplying electrical power to the DVD processor 12. Due to such power supply, the DVD processor 12 resumes the operation (shifts from the sleep state to the normal state) and outputs an inquiry to the key controller 18. The key controller 18, in response to the request from the DVD processor 12, returns the key operation state. Specifically, when the user presses the "PLAY" key on the remote controller 40, the corresponding command is returned from the key controller 18 to the DVD processor 12, which, in response to the reproduction command, provides an instruction to the DVD drive 10. The DVD drive 10 then reproduces the medium, and supplies the reproduced data to the DVD processor 12. As described above, the system can shift from the sleep state to the normal state automatically in response to simple insertion of a medium.

Similarly, when a video signal is input from the video input terminal, the video signal detection circuit formed by the diode 42 and the capacitor 44 as described above detects the input of the video signal and supplies the video signal to the key controller 18. The key controller 18 then instructs the power source circuit 16 to control the switch 16a to turn ON, whereby the DVD processor 12 is recovered from the sleep state to the normal state. At this point, in consideration of the possibility that a user may wish to perform video recording on a DVD by connecting a video camera or the like to the video input terminal, it is preferable to enable immediate start of video recording without requiring any additional user operation.

In order to meet such a demand, in the present embodiment, when a user presses the video recording "REC" key of the operation switch 22 on the system body, video recording is automatically started using input of a video signal from the video input terminal as a trigger. In the present embodiment, this is referred to "easy video recording mode". When the system is in the normal state, the user operates the operation switch 22 or the remote controller 40 to set the desired recording condition, and then presses the video recording key "REC" of the operation switch 22. The recording condition and the recording command are transmitted from the key controller 18 to the DVD processor 12. The DVD processor 12 then writes the recording condition and the recording command (i.e. an easy video recording command) on the EEPROM 28. Here, when the recording key of the operation switch 22 is pressed, mode shift to the easy video recording mode is performed, whereas when the recording key of the remote controller 40 is pressed, mode shift to the normal video recording mode is performed (the user then operates the remote controller 40 and sets the recording condition once again). Here, the recording condition set by the user may include the following, for example:

<Recording Condition>

(a) input source

Selection is performed whether selection of a plurality of input sources is fixed or switched automatically. For automatic switching, the priority order among sources is further selected.

(b) selection of a recording format in accordance with a medium type

Selection of a DVD-VIDEO or DVD-VR is performed when a medium is DVD-R/RW, and selection of VCD, SVCD, or CD-DA is made when a medium is CD-R/RW.

(c) with or without auto finalize

Selection is made as to whether or not finalize is performed when recording is completed. Media other than DVD+RW generally need appropriate finalize.

(d) selection of image quality (e) with or without auto pause

Selection is made as to whether automatic pause is performed when there is no input signal.

The menu of the above recording conditions is displayed on a monitor or the LDC 20 which is connected to the system, and the user sets the recording condition by selecting and inputting the condition from the menu.

Figure 3:
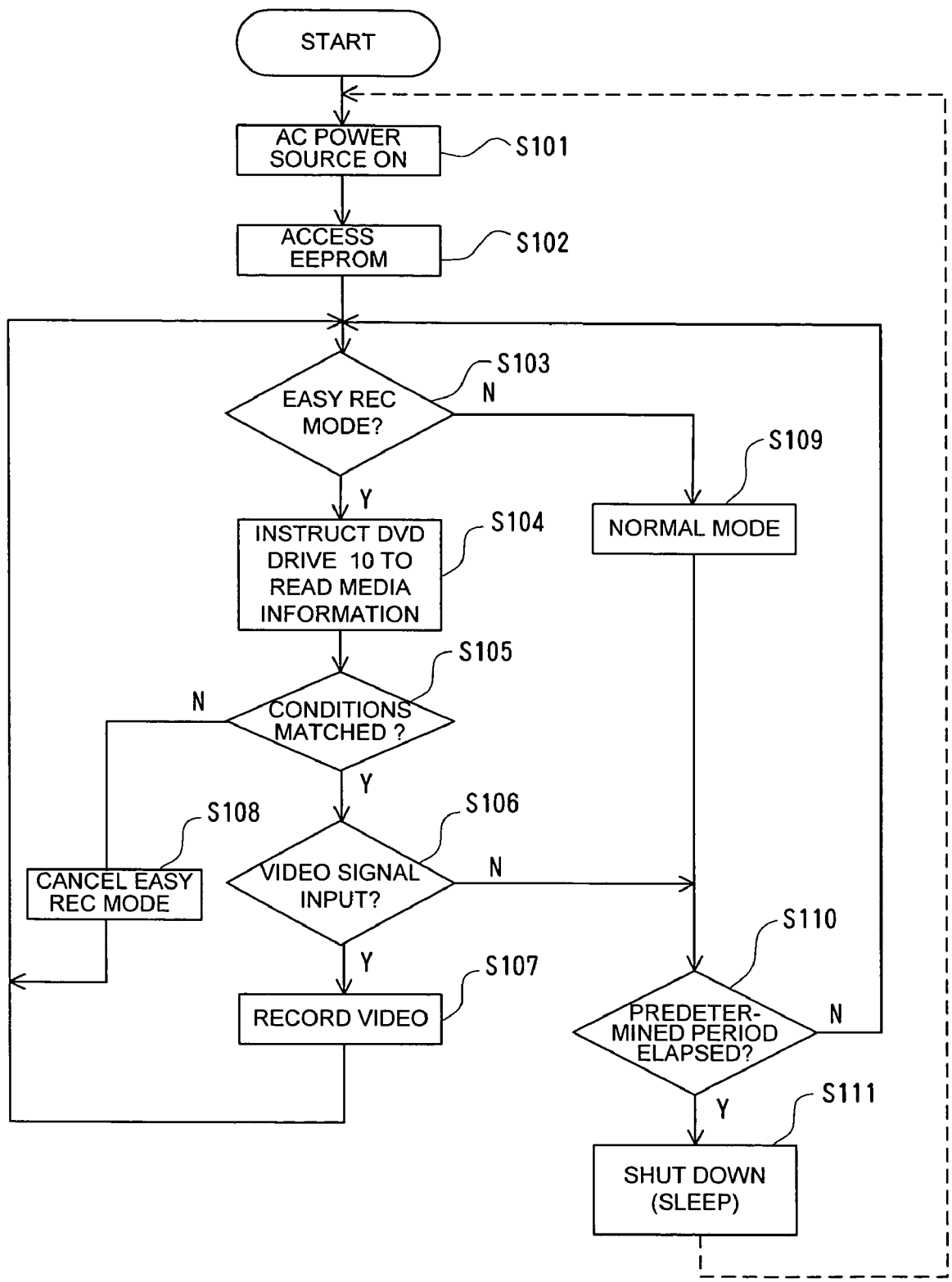
FIG. 3 is a flowchart showing a process when an easy video recording mode is set.

FIG. 3 shows a process flowchart in an example wherein, after the AC adapter is connected and with the system being in the normal state, the user sets the recording conditions and presses the video recoding key of the operation switch 22 to set an easy video recording mode. Here, it is assumed that these recording conditions and the easy video recording command have been already written in the EEPROM 28.

When the AC adapter 14 is connected to the AC power source (S101), the DVD processor 12 accesses the EEPROM 28 (S102) to confirm whether or not the easy video recording mode has been set (S103). If the easy video recording command and the recording conditions are stored in the EEPROM 28, the DVD processor 12 further outputs inquiries to the DVD drive 10 (S104). If the DVD drive 10 is in the standby mode, the microcomputer of the DVD drive 10 returns the information concerning media (type of a medium or the like) held in the microcomputer to the DVD processor 12 via the ATAPI interface. If the information concerning media is not stored in the microcomputer of the DVD drive 10, the microcomputer obtains the information concerning media in accordance with the instruction from the DVD processor 12 and then returns the information to the DVD processor 12.

The DVD processor 12 then determines whether or not the media information obtained from the DVD drive 10 and the media information defined in the recording condition match (S105). For example, when the recording condition assumes a DVD-R and a medium which is actually inserted in the DVD drive 10 is a DVD-R, the conditions are determined to match. More specifically, it is determined that recording in accordance with the recording conditions is possible, and it is confirmed through the video decoder 32 whether or not a video signal is input (S106). If a video signal is input, video recording is started (S107). On the other hand, if a medium which is set in the easy video recording mode and a medium which is actually inserted in the DVD drive 10 do not match, or if other recording conditions stored in the EEPROM 28 and the information obtained from the DVD drive 10 do not match, the DVD processor 12 inhibits start of video recording, cancels the easy video recording mode stored in the EEPROM 28 (S108), and prompts the user to set the recording conditions once again.

If the easy video recording mode is not set at step S103, the DVD processor 12 shifts to the normal state (S109) and performs the normal operation. It is then determined whether or not a predetermined period has elapsed without the user's operation or predetermined actions (S110). Similarly, if the easy video recording mode is set and a video signal is not input at step S106, it is also determined at step S110 whether or not a predetermined period has elapsed. If a predetermined period has elapsed in the non-operation or non-action state, the key controller 18, due to an instruction from the DVD processor 12, controls the switch 16a of the power source circuit 16 to turn OFF, whereby power supply to the DVD processor 12 is interrupted to shift the DVD processor 12 to the sleep state (S111).

In the sleep state, the key controller 18 continuously monitors whether or not a video signal is input, whether or not the remote controller 40 or the operation switch 22 is operated, or whether or not a medium is inserted into the DVD drive 10.

When at least one of the actions in these conditions is performed, the key controller 18 controls the switch 16a of the power source circuit 16 to turn ON, thereby activating the DVD processor 12. In this embodiment, a video signal which is detected by the detection circuit formed by the diode 42 and the capacitor 44 is input to the key controller 18, which then controls the switch 16a of the power source circuit 16, whereby the DVD processor 12 is activated. Specifically, the DVD processor 12 recovers from the sleep state (S111), and resumes the operations starting from step S101.

In the present embodiment, the system, even in the sleep state, can automatically return to the normal state due to input of a video signal and can immediately start recording of a video signal. When the eject key or the play key of the operation switch 22 or the remote controller 40 is pressed, the key controller 18 transmits these operation signals to the DVD processor 12, which then cancels the easy video recording mode which is stored in the EEPROM 28.

Further, according to the present embodiment, while in a portable DVD recorder system, the AC adapter 14 can be connected to the AC power source located at an arbitrary position, there is a possibility that the AC adapter 14 is unplugged from the AC power source inadvertently or by accident. In this case, supply of the power source voltage to the DVD drive 10, the DVD processor 12, and the key controller 18 is interrupted, and the media information held in the microcomputer of the DVD drive 10 is lost. However, if the command of the easy video recording mode is stored, along with the recording conditions, in the EEPROM 28 which is a non-volatile memory, an operation of obtaining the media information which the microcomputer of the DVD drive 10 has lost once again is performed at step S104 in FIG. 3. As such, even after the AC adapter 14 is connected to the AC power source once again, video recording can be resumed immediately.

Figure 4:
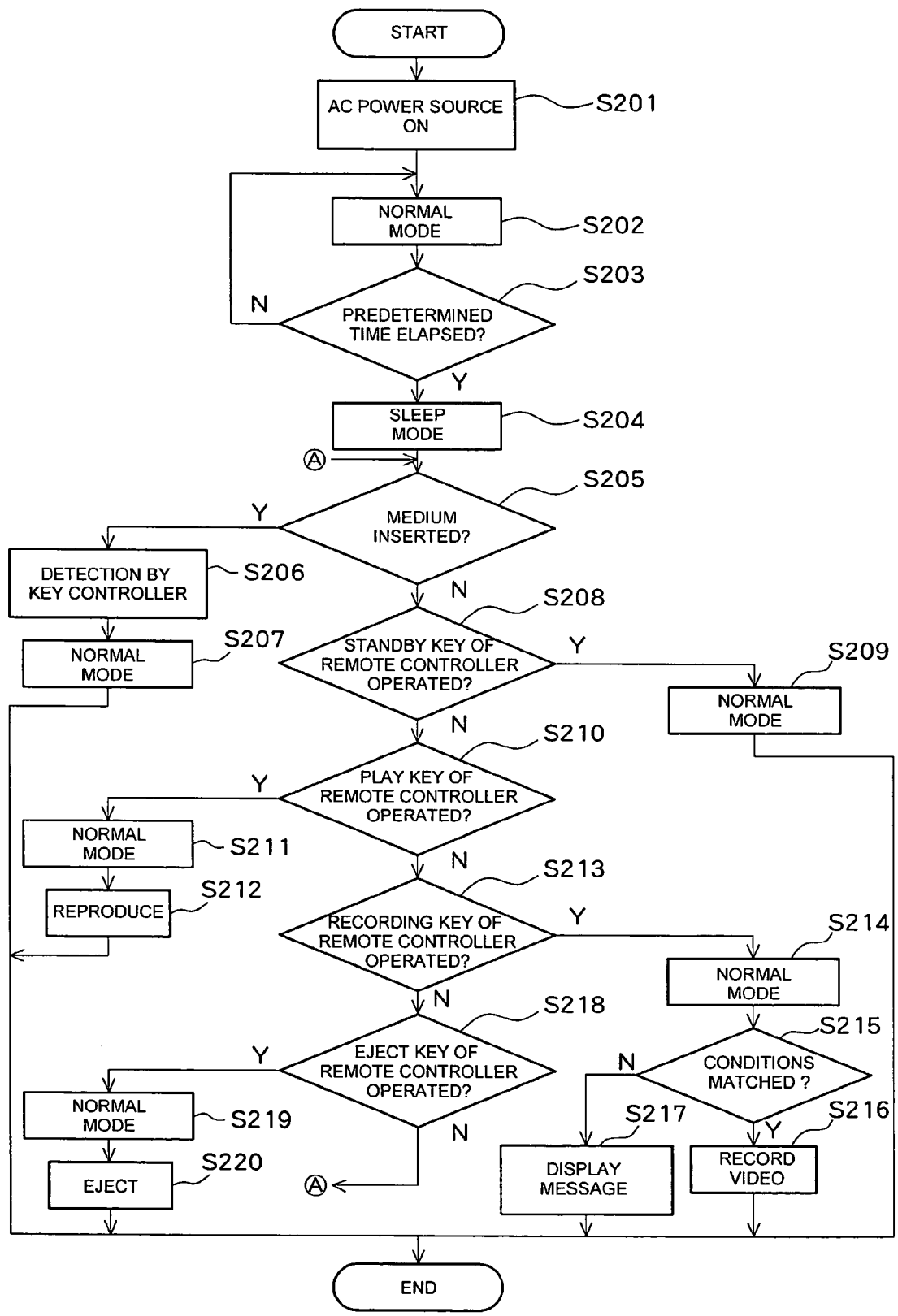
FIG. 4 is a flowchart showing a process in accordance with a key operation.

FIG. 4 shows a process flowchart in accordance with the key operation. A user connects the AC adapter 14 to the AC power source to turn the power source ON (S201). As neither the operation switch 22 of the system nor the remote controller 40 includes a power source switch as described above, connection of the AC adapter 14 to the AC power source directly causes the system to shift to the normal state (S202). More specifically, the power source circuit 16 supplies a voltage to the DVD processor 12, the DVD drive 10, and the key controller 18, whereby data recording/reproducing in the DVD drive 10 is allowed. When recording a video image captured by the user using a portable video camera or the like on a DVD, the camera is connected to the video input terminal and the "REC" key of the remote controller 40 is pressed. A video signal input from the video input terminal is decoded in the video decoder 32 and is then supplied to the DVD processor 12. The DVD processor 12, in accordance with the recording command from the key controller 18, instructs the DVD drive 10 to perform video recording and supplies video data to the DVD drive 10. The DVD drive 10 sequentially records the video data supplied from the DVD processor 12 on the DVD. Here, the DVD processor 12, in the normal state, may supply the input video data to the DVD drive 10 for recording in accordance with the instruction from the video decoder 32 (rather than in accordance with a command from the key controller 18).

On the other hand, after shifting to the normal state, the DVD processor 12 determines whether or not a non-operational state of a predetermined length has elapsed (S203). If the predetermined period has elapsed, the DVD processor 12 instructs the key controller 18 to shift to the sleep state. The key controller 18, in response to such an instruction, controls the switch 16a of the power source circuit 16 to turn OFF, thereby causing the DVD processor 12 to shift to the sleep state in which the operation of the DVD processor 12 stops (S204). Thus, power saving is achieved.

After the DVD processor 12 has shifted to the sleep state, the key controller 18 determines whether or not a medium is inserted in the DVD drive 10 (S205). This determination is performed based on the presence of an insertion signal from the DVD drive 10 using the ATAPI interface. When an insertion signal is transmitted from the DVD drive 10, the key controller 18 detects insertion of a medium by this signal (S206) and, in response to this signal, controls the switch 16a of the power source circuit 16 to turn ON, thus supplying a voltage to the DVD processor 12. As such, the DVD processor 12 resumes the operation and the system shifts from the sleep state to the normal state (S207).

Further, the key controller 18 determines whether or not the standby (STANDBY) key of the remote controller 40 has been pressed in the sleep state (S208). If the STANDBY key has been pressed, the key controller 18 responds to this signal to control the switch 16a of the power source circuit 16 to turn ON, for supplying a voltage to the DVD processor 12 and each section. Thus, the DVD processor 12 resumes the operation and the system shifts from the sleep state to the normal state (S209).

The key controller 18 determines whether or not the PLAY key of the remote controller 40 has been pressed in the sleep state (S210). If the PLAY key has been pressed, the key controller 18 responds to this signal to control the switch 16a of the power source circuit 16 to turn ON, for supplying a voltage to the DVD processor 12 and each section. Thus, the DVD processor 12 resumes the operation and the system shifts from the sleep state to the normal state (S211). Specifically, the DVD processor 12 communicates an inquiry to the key controller 18, provides an instruction to the DVD drive 10 in accordance with the response (a play command) from the key controller 18, and outputs the reproduced data supplied from the DVD drive 10 through the video output terminal or the audio output terminal (S212).

Further, the key controller 18 determines whether or not the video recording (REC) key of the remote controller 40 has been pressed in the sleep state (S213). If the REC key has been pressed, the key controller 18, in response to this signal, controls the switch 16a of the power source circuit 16 to turn ON, for supplying a voltage to the DVD processor 12 and each section. Thus, the DVD processor 12 resumes the operation and the system shifts from the sleep state to the normal state (S214). Specifically, the DVD processor 12 inquires to the key controller 18, provides an instruction to the DVD drive 10 in accordance with a return (a video recording command) from the key controller 18, and records the video signal which is input from the video input terminal. Here, there are instances where an input video signal cannot be recorded depending on the type of a medium which is inserted in the DVD drive 10. Accordingly, the DVD processor 12 outputs inquiries to the DVD drive 10 as to whether or not a recordable medium is inserted. If a recordable medium is inserted, it is determined that recording can be performed without problem (YES at step S215) and recording is started (S216). In such a case, a user can record desired video simply by pressing the video recording (REC) key on the remote controller 40 while the DVD processor 12 is in the sleep state, and desired video can be recorded rapidly and easily. It is expected that a user who wishes to record a desired image when necessary with a medium being continuously inserted in the DVD drive 10 first operates the recording key at a required timing, and the system of the present embodiment can immediately respond to such a request. On the other hand, if it is determined that a video signal cannot be recorded because, for example, a CD-R or a CD-RW is inserted in the DVD drive 10 as a result of the inquiries from the DVD processor 12 to the DVD drive 10, it is determined that recording cannot be performed (NO at step S215), and an appropriate message is displayed on the LCD 20 or a monitor connected to the system so as to communicate this result to the user (S217).

In addition, the key controller 18 determines whether or not the EJECT key of the remote controller 40 has been pressed in the sleep state (S218). If the EJECT key has been pressed, the key controller 18, in response to this signal, controls the switch 16a of the power source circuit 16 to turn ON, for supplying a voltage to the DVD processor 12 and each section. Thus, the DVD processor 12 resumes the operation and the system shifts from the sleep state to the normal state (S219). Specifically, the DVD processor 12 makes inquires to the key controller 18, provides an instruction to the DVD drive 10 in accordance with an ejection command for performing an ejecting operation (S220).

Processing similar to the above-described process is performed when a video signal is input from the video input terminal or when the operation switch 22 of the system body is operated in the sleep state. For example, when a video signal is input in the sleep state, the key controller 18 detects a video signal which is input via the diode 42 and the capacitor 44, and in accordance with this signal, controls the switch 16a of the power source circuit 16 to turn ON for shifting the DVD processor 12 from the sleep state to the normal state.

As described above, according to the present embodiment, no power source switch (a power source key) is provided and the system automatically shifts to the normal state when the AC adapter 14 is connected to the AC power source. Further, when a video signal is input, under the conditions preset by the user, automatic video recording is immediately started when the system is in a normal state, and the normal state which is a power supply state is automatically recovered and then automatic video recording is started when the system is in a sleep state which is a power source interruption state. Accordingly, a very high level of user operability can be achieved. Further, even when AC power source is turned OFF, video recording can be continued under the same conditions once the AC power source is again turned ON because the easy video recording mode and the recording conditions are stored and retained in the EEPROM 28.

In addition, according to the present embodiment, it is possible to reliably shift from the sleep state to the normal state when a medium is inserted. Because the normal state is recovered and simultaneously video recording is automatically started when the recording key is operated if recording conditions are fulfilled, it is possible to immediately respond to user requests.

While the preferred embodiment of the present invention has been described using specific terms, such description is for illustrative purposes only, and it is to be understood that changes and variations may be made without departing from the spirit or scope of the appended claims.

What is claimed is:

1. A data recording and reproducing system including an optical disk apparatus which records and reproduces data with respect to an optical disk, the system comprising:

a processor connected to the optical disk apparatus via an interface, for transmitting a command to the optical disk apparatus and receiving reproduced data from the optical disk apparatus, the processor including a rewritable non-volatile memory;

key operation means;

a key controller for interpreting a key operation signal generated by the key operation means and providing an instruction to the processor;

a power source circuit for supplying a power source voltage to the optical disk apparatus, the processor, and the key controller, the power source circuit being capable of switching states between a voltage supply state and a voltage interruption state at least with respect to the processor;

an input signal terminal; and an input signal detector for detecting that a signal is input from the input signal terminal and outputting the signal to the key controller;

wherein when a predetermined video recording condition and a key operation signal "RECORD" are input form the key operation means:

the key controller provides a predetermined video recording mode command to the processor; and the processor writes the video recording condition and the video recording mode command onto the rewritable non-volatile memory, and, when input of the signal is detected by the input signal detector, causes the power source circuit to return from the voltage interruption state to the voltage supply state and then supplies the signal to the optical disk apparatus and records the signal on the optical disk in accordance with the video recording condition and the video recording mode command which are stored in the rewritable non-volatile memory.

2. The system according to claim 1, wherein the processor shifts from a normal state which is the voltage supply state to a sleep state which is the voltage interruption state when a predetermined period of non-operation state has elapsed, and the key controller, in response to an input signal based on an external effect, instructs the power source circuit to switch from the voltage interruption state to the voltage supply state for causing the processor to return from the sleep state to the normal state.

3. The system according to claim 1, wherein the power source circuit supplies an electric power from an AC power source to the optical disk apparatus, the processor, and the key controller, and the processor supplies the signal to the optical disk apparatus in accordance with the video recording condition when the AC power source shifts from an OFF state to an ON state and the video recording condition which is stored in the rewritable non-volatile memory matches optical disk information which is supplied from the optical disk apparatus.

4. The system according to claim 1, wherein the interface is an ATAPI interface.

* * * * *

UNITED STATES PATENT AND TRADEMARK OFFICE
CERTIFICATE OF CORRECTION

PATENT NO. : 7,496,773 B2  Page 1 of 1
APPLICATION NO. : 11/231200
DATED : February 24, 2009
INVENTOR(S) : S. Umehara et al.

It is certified that error appears in the above-identified patent and that said Letters Patent is hereby corrected as shown below:

| COLUMN | LINE | ERROR |
|---|---|---|
| 11 (Claim 1, | 16 line 25) | "form" should read --from-- |

Signed and Sealed this

Sixteenth Day of March, 2010

David J. Kappos
*Director of the United States Patent and Trademark Office*